United States Patent
Onozato et al.

(10) Patent No.: US 12,183,122 B2
(45) Date of Patent: Dec. 31, 2024

(54) INFORMATION PROCESSING DEVICE

(71) Applicant: NEC Corporation, Tokyo (JP)

(72) Inventors: Muneaki Onozato, Tokyo (JP); Satoshi Terasawa, Tokyo (JP); Ryoma Oami, Tokyo (JP); Yadong Pan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 487 days.

(21) Appl. No.: 17/421,532

(22) PCT Filed: Jan. 18, 2019

(86) PCT No.: PCT/JP2019/001464
§ 371 (c)(1),
(2) Date: Jul. 8, 2021

(87) PCT Pub. No.: WO2020/148889
PCT Pub. Date: Jul. 23, 2020

(65) Prior Publication Data
US 2022/0058380 A1 Feb. 24, 2022

(51) Int. Cl.
*G06V 40/20* (2022.01)
*G06V 20/52* (2022.01)
*G06V 40/10* (2022.01)

(52) U.S. Cl.
CPC .............. *G06V 40/20* (2022.01); *G06V 20/52* (2022.01); *G06V 40/103* (2022.01)

(58) Field of Classification Search
CPC ....... G06V 40/20; G06V 20/52; G06V 40/103
See application file for complete search history.

(56) References Cited

U.S. PATENT DOCUMENTS

| 7,944,468 | B2 | 5/2011 | Hoffman et al. |
| 2010/0106707 | A1 | 4/2010 | Brown et al. |
| 2012/0308090 | A1 | 12/2012 | Sukegawa et al. |
| 2014/0347479 | A1* | 11/2014 | Givon .................. G06V 40/103 382/116 |
| 2017/0316258 | A1* | 11/2017 | Hoy ........................ G06V 20/52 |
| 2018/0061159 | A1 | 3/2018 | Sato et al. |
| 2019/0095600 | A1 | 3/2019 | Chan et al. |

(Continued)

FOREIGN PATENT DOCUMENTS

| JP | 2006-120084 A | 5/2006 |
| JP | 2008-15686 A | 1/2008 |

(Continued)

OTHER PUBLICATIONS

International Search Report for PCT Application No. PCT/JP2019/001464, mailed on Mar. 26, 2019.

(Continued)

*Primary Examiner* — David Perlman

(57) ABSTRACT

An information processing device according to the present invention includes: a storage means that stores reference attribute information representing an attribute of a person corresponding to a target place; an extraction means that extracts person attribute information representing an attribute of a person in a captured image obtained by capturing an image of the target place; and a detection means that detects a predetermined person in the captured image based on the reference attribute information and the person attribute information.

12 Claims, 11 Drawing Sheets

(56) References Cited

U.S. PATENT DOCUMENTS

| | | | |
|---|---|---|---|
| 2019/0279468 A1* | 9/2019 | Kishi | G06V 40/172 |
| 2021/0192224 A1 | 6/2021 | Nakagawa et al. | |
| 2024/0087096 A1* | 3/2024 | Le Jouan | G06F 16/51 |

FOREIGN PATENT DOCUMENTS

| | | | |
|---|---|---|---|
| JP | 2008047074 A | * | 2/2008 |
| JP | 2008-083933 A | | 4/2008 |
| JP | 2009-252215 A | | 10/2009 |
| JP | 2011-034357 A | | 2/2011 |
| JP | 2011-227647 A | | 11/2011 |
| JP | 2013-003964 A | | 1/2013 |
| JP | 2015-088816 A | | 5/2015 |
| JP | 2018-037075 A | | 3/2018 |
| JP | 2018-085597 A | | 5/2018 |
| JP | 2018-93347 A | | 6/2018 |
| JP | 2018-160219 A | | 10/2018 |
| JP | 2018-173914 A | | 11/2018 |
| WO | 2017/130902 A1 | | 8/2017 |
| WO | 2020/148889 A1 | | 7/2020 |

OTHER PUBLICATIONS

Taiwanese Office Action for TW Application No. 109100674 mailed on Apr. 13, 2022 with English Translation.

Communication dated Jul. 11, 2023 issued by the Japanese Patent Office for JP Patent Application No. 2022-154460.

US Ofice Action for U.S. Appl. No. 18/238,376, mailed on Mar. 21, 2024.

US Office Action for U.S. Appl. No. 18/238,382, mailed on Mar. 21, 2024.

Japanese Office Action for JP Application No. 2023-218797 mailed on Oct. 22, 2024 with English Translation.

US Office Action for U.S. Appl. No. 18/238,376, mailed on Sep. 26, 2024.

US Corrected Notice of Allowability for U.S. Appl. No. 18/238,382, mailed on Nov. 4, 2024.

* cited by examiner

Fig.2B

| SCENE INFORMATION | | | REFERENCE ATTRIBUTE INFORMATION | |
|---|---|---|---|---|
| PLACE INFORMATION | ENVIRONMENT INFORMATION | | PERSON ATTRIBUTE | ACTION |
| COSMETICS SECTION | WEEKDAY | | • WOMAN IN HER TWENTIES OR MORE | • LOOK AT PRODUCT<br>• PICK UP PRODUCT |
| | HOLIDAY | | • WOMAN IN HER TWENTIES OR MORE<br>• COUPLE OF MAN AND WOMAN IN THEIR THIRTIES OR MORE | • LOOK AT PRODUCT<br>• PICK UP PRODUCT |
| XX DEPARTMENT GINZA STORE | 10:00 TO 16:00 | | • WOMAN IN HER FORTIES OR MORE<br>• MAN IN HIS SIXTIES OR MORE | |
| | SUMMER | | • LIGHTLY DRESSED | |

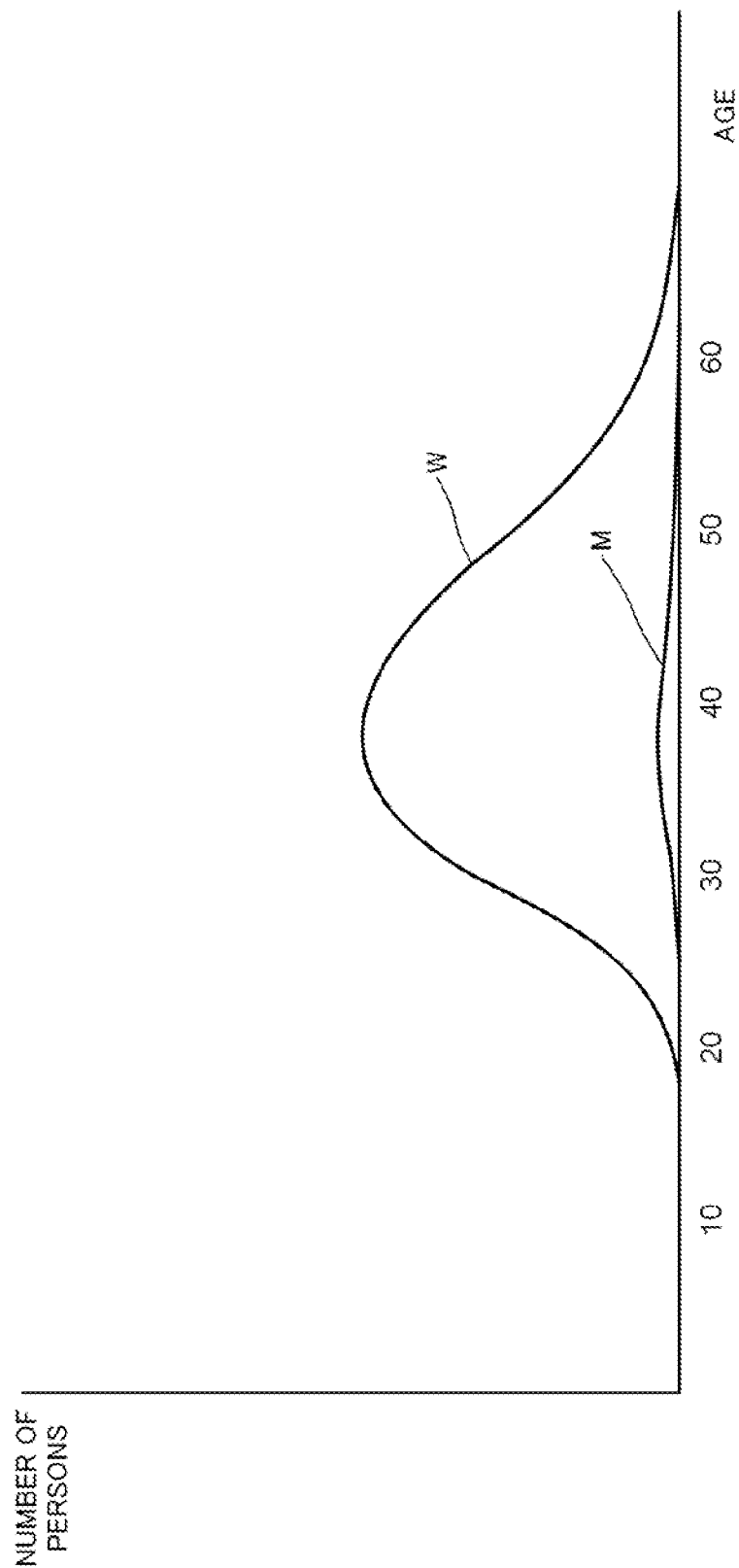

INFORMATION PROCESSING DEVICE

This application is a National Stage Entry of PCT/JP2019/001464 filed on Jan. 18, 2019, the contents of all of which are incorporated herein by reference, in their entirety.

TECHNICAL FIELD

The present invention relates to an information processing device that detects a person who is in a target place, an information processing method, and a program.

BACKGROUND ART

In a place where a large number of unspecified persons gather, such as an airport, a station, a store and an event venue, there may be a person who may conduct a criminal act or a nuisance. Because such a person may act suspiciously or be in an abnormal biological condition and may be determined to be a suspicious person by appearance, it is possible to take measures in advance.

On the other hand, there may be only a few guards or no guards detecting a suspicious person, and it may be impossible to determine to be a suspicious person by appearance. In consideration of such cases, a technique for automatically detecting a suspicious person is desired.

Patent Document 1: Japanese Unexamined Patent Application Publication No. JP-A 2018-037075

For example, as disclosed in Patent Document 1, a technique for automatically detecting a suspicious person at an airport or the like is disclosed. In Patent Document 1, as an example, biological data of persons are collected and a suspicious person is detected in the immigration area of an airport.

However, in the method of detecting a suspicious person from biological data as described in Patent Document 1, it is not easy to detect biological data from a large number of unspecified persons in the first place. Therefore, a suspicious person cannot be detected, and not only a suspicious person but also a desired person cannot be detected in a certain place.

SUMMARY OF THE INVENTION

Accordingly, an object of the present invention is to provide an information processing device that can solve the abovementioned problem that a desired person cannot be easily detected in a target place.

An information processing device according to an aspect of the present invention includes: a storage means that stores reference attribute information representing an attribute of a person corresponding to a target place; an extraction means that extracts person attribute information representing an attribute of a person in a captured image obtained by capturing an image of the target place; and a detection means that detects a predetermined person in the captured image based on the reference attribute information and the person attribute information.

Further, a computer program according to another aspect of the present invention includes instructions for causing an information processing device to realize: an extraction means that extracts person attribute information representing an attribute of a person in a captured image obtained by capturing an image of a target place; and a detection means that detects a predetermined person in the captured image, based on reference attribute information representing an attribute of a person corresponding to the target place stored in a storage means, and based on the person attribute information.

Further, an information processing method according to another aspect of the present invention includes: extracting person attribute information representing an attribute of a person in a captured image obtained by capturing an image of a target place; and detecting a predetermined person in the captured image, based on reference attribute information representing an attribute of a person corresponding to the target place stored in a storage means, and based on the person attribute information.

With the configurations as described above, the present invention allows for easy detection of a desired person in a target place.

BRIEF DESCRIPTION OF DRAWINGS

FIG. 2B is a view showing an example of information stored in a reference information storage part disclosed in FIG. 2A;

FIG. 3 is a view showing an example of information stored in a monitoring device disclosed in FIG. 1;

EXAMPLE EMBODIMENT

First Example Embodiment

Figure 5:
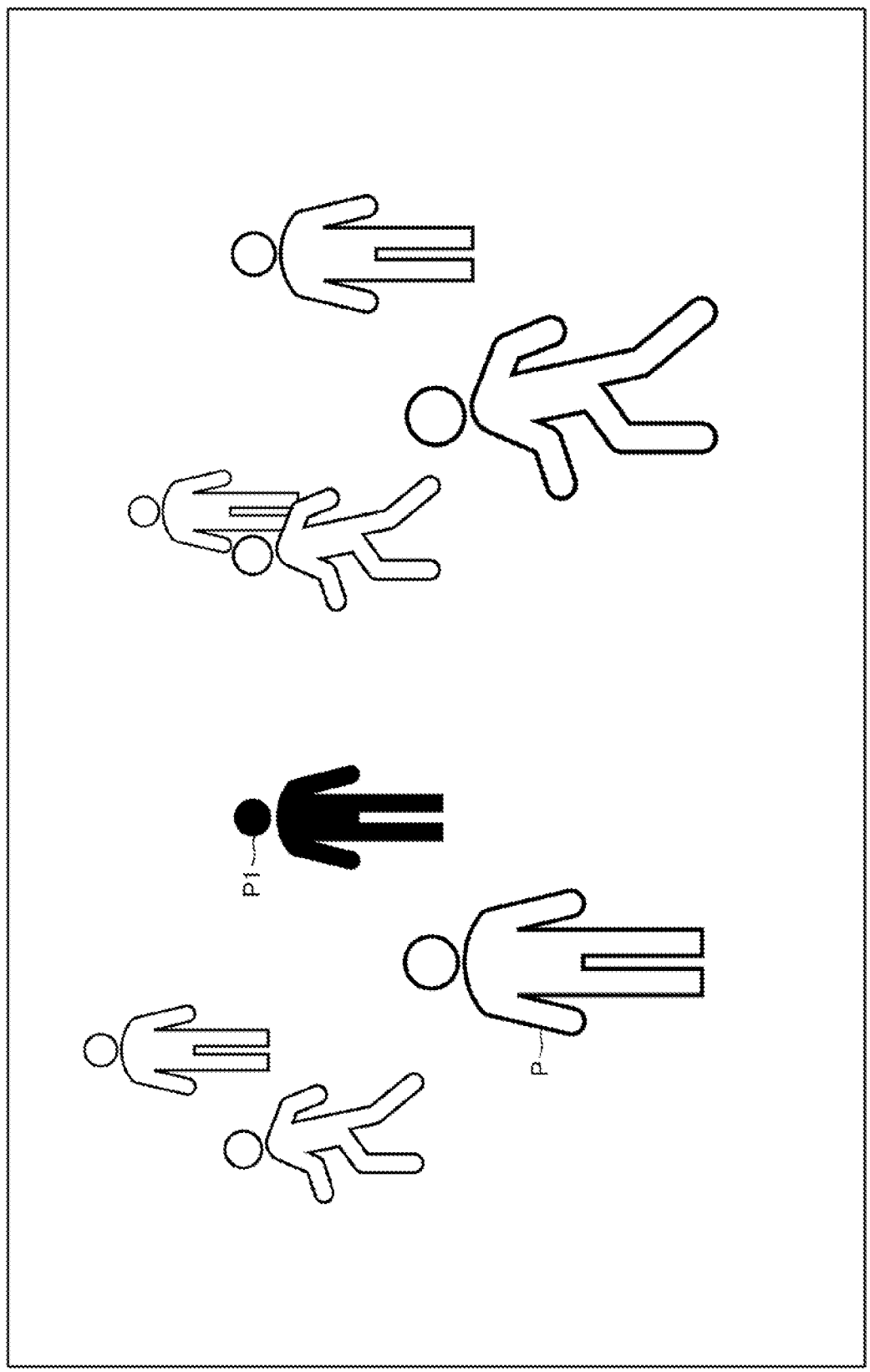
FIG. 5 is a view showing an example of an image output by the monitoring device disclosed in FIG. 1.
Figure 6:
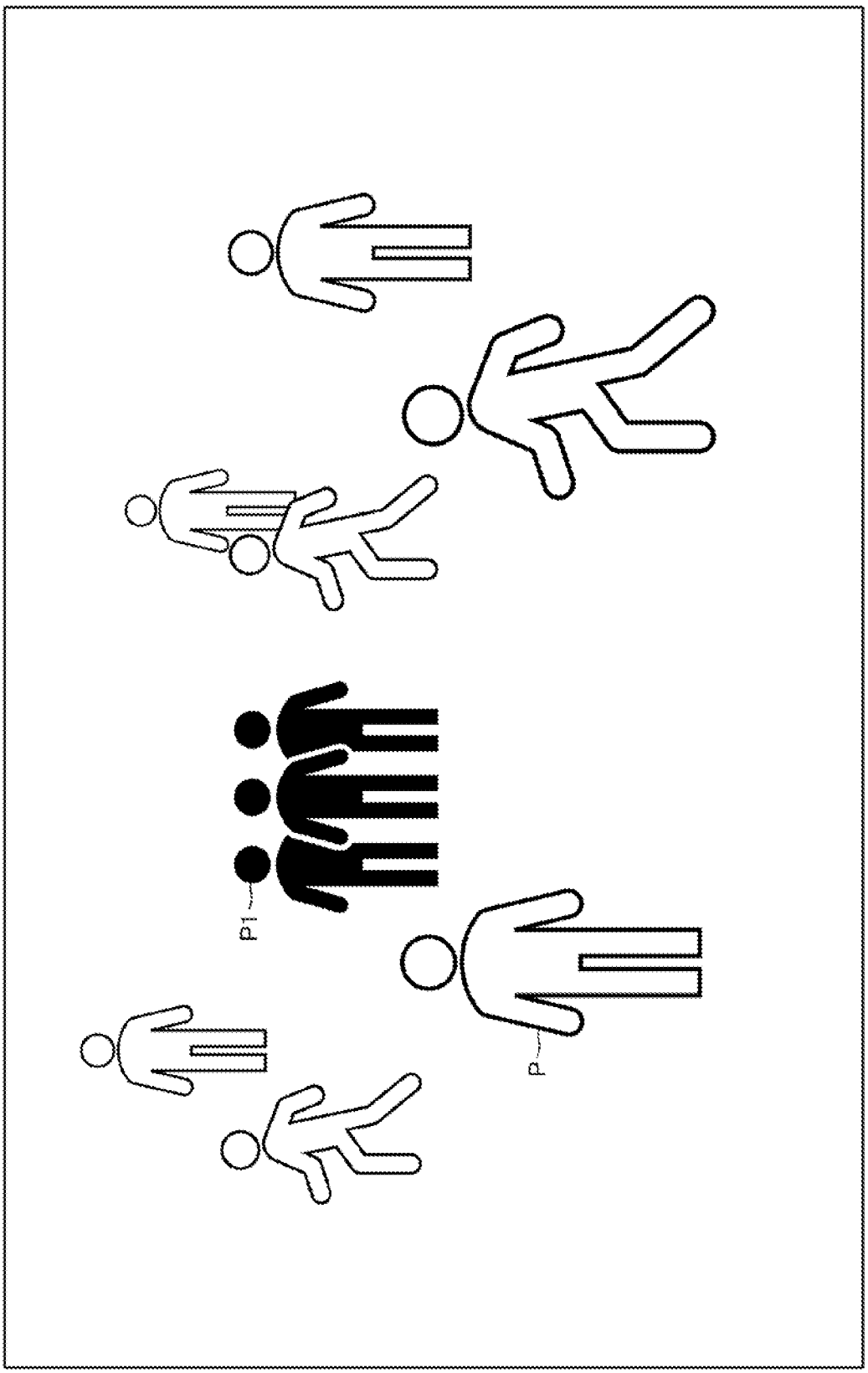
FIG. 6 is a view showing an example of an image output by the monitoring device disclosed in FIG. 1.
Figure 7:
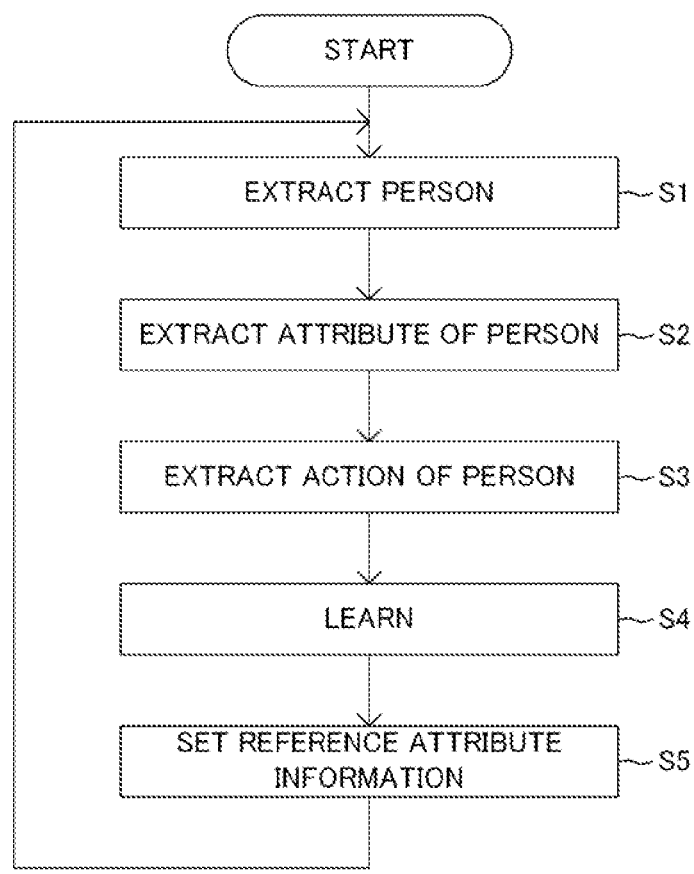
FIG. 7 is a flowchart showing a processing operation executed by the monitoring device disclosed in FIG. 1.
Figure 8:
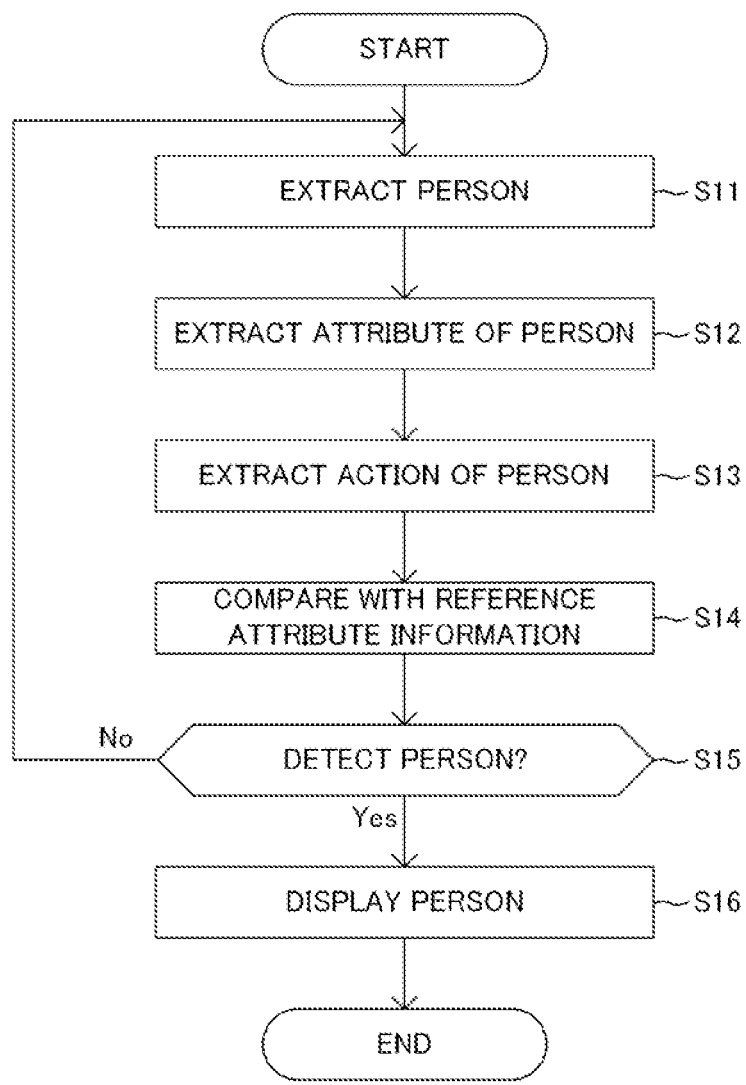
FIG. 8 is a flowchart showing a processing operation executed by the monitoring device disclosed in FIG. 1.

A first example embodiment of the present invention will be described with reference to FIGS. 1 to 8. FIGS. 1 to 6 are views for describing the configuration of an information processing system. FIGS. 7 and 8 are views for describing a processing operation of the information processing system. Below, the configuration and operation of the information processing system will be described together.

The information processing system according to the present invention is used to detect a desired person, for example, a person determined to be a suspicious person based on a preset criterion from among persons P who are in a set target place R such as a store and a facility. In the following description, as an example, a case will be described where a target place is "cosmetics section in department store" and a detection target is a person who can be identified as "suspicious person" in this place. However, in the present invention, a target place may be any place such as a store and a facility, for example, a jewelry store, a game center and an amusement park. Besides, in the present invention, a detection target may be any person, for example, not only a suspicious person but also a person with an attribute desired by a store. Consequently, the present invention can be utilized for security by monitoring a suspicious person in a target place, and can be utilized for marketing activities such as active service for a person with a sales target attribute. Meanwhile, a detection target person may be, for example, a lost child, a sick person, an elderly person and a cared person.

Figure 1:
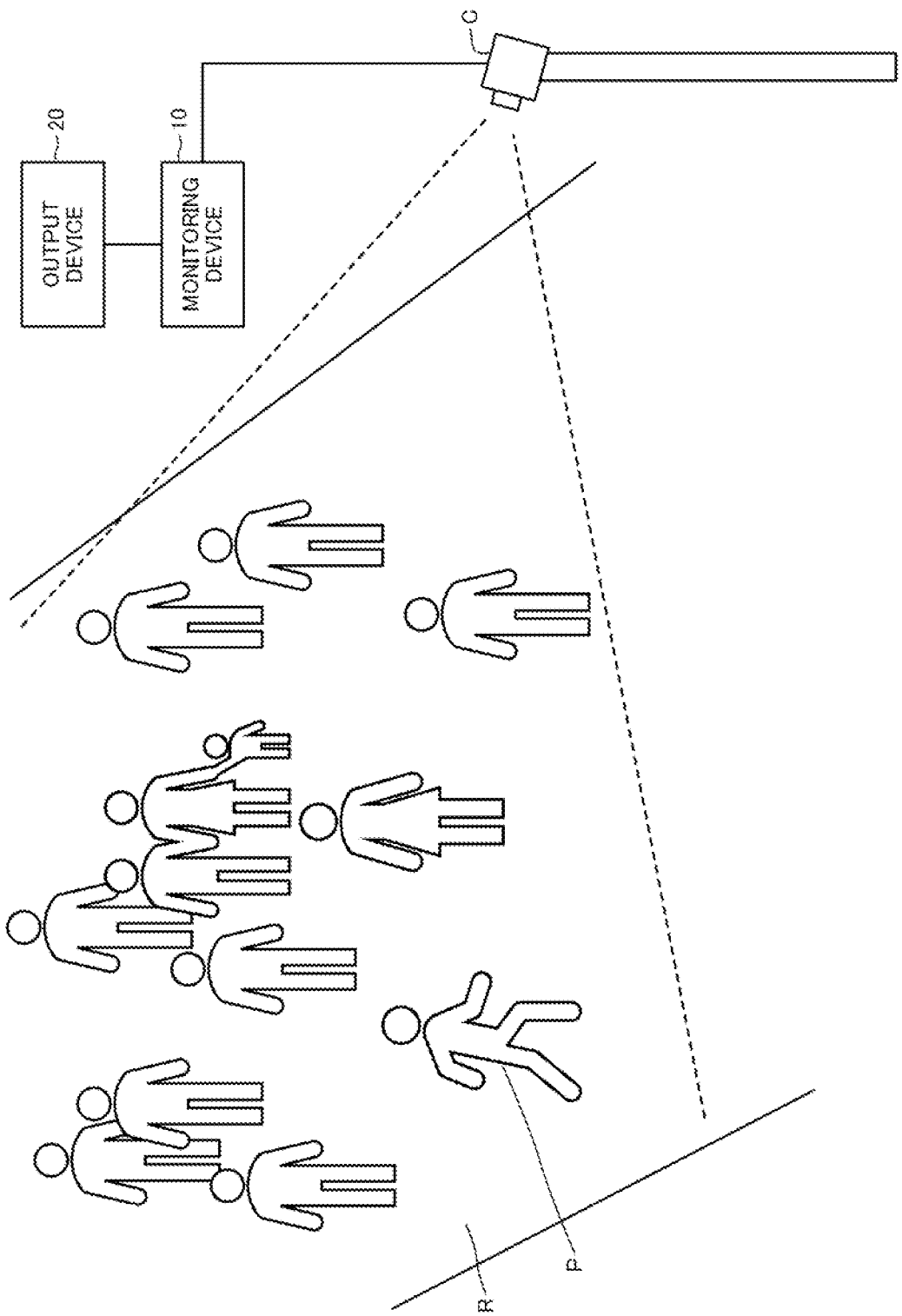
FIG. 1 is a view showing the entire configuration of an information processing system according to a first example embodiment of the present invention.

As shown in FIG. 1, the information processing system according to this example embodiment includes a camera C that captures an image of a space to be the target place R, a monitoring device 10 that monitors the person P in the captured image, and an output device 20 that outputs the result of the monitoring. The monitoring device 10 is configured by one or a plurality of information processing devices each including an arithmetic logic unit and a storage unit. The output device 20 is configured by one or a plurality of information processing devices each including an arithmetic logic unit and a storage unit, and further includes a display device. As will be described later, such a display device is for displaying and outputting a detected person together with a captured image captured by the monitoring device 10. Below, the configuration of the monitoring device 10 will be mainly described in detail.

Figure 2A:
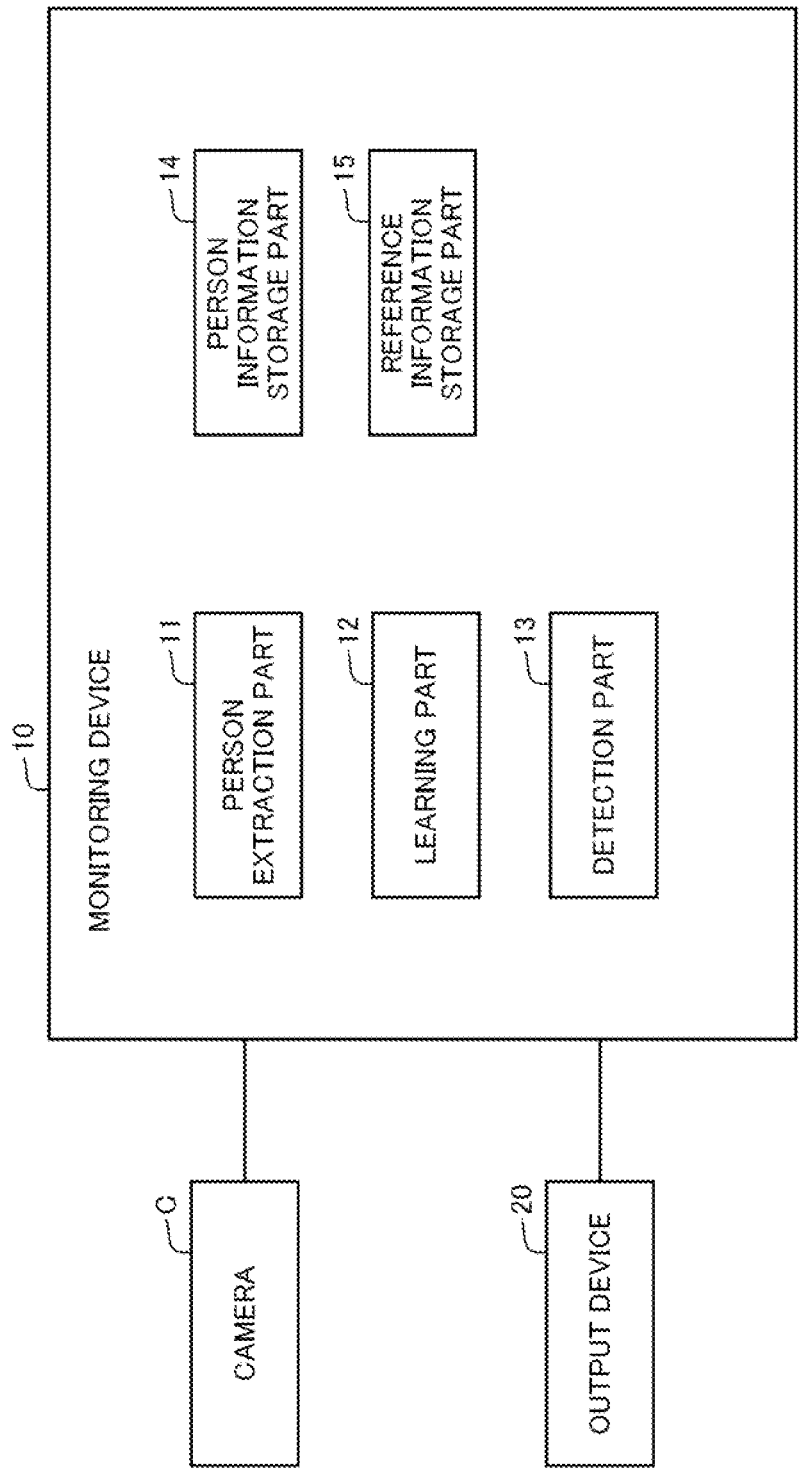
FIG. 2A is a block diagram showing the configuration of the information processing system according to the first example embodiment of the present invention.

As shown in FIG. 2A, the monitoring device 10 includes a person extraction part 11, a learning part 12, and a detection part 13 that are constructed by the arithmetic logic unit executing a program. Moreover, the monitoring device 10 includes a person information storage part 14 and a reference information storage part 15 that are formed in the storage unit. Below, the respective components will be described in detail.

Figure 4:
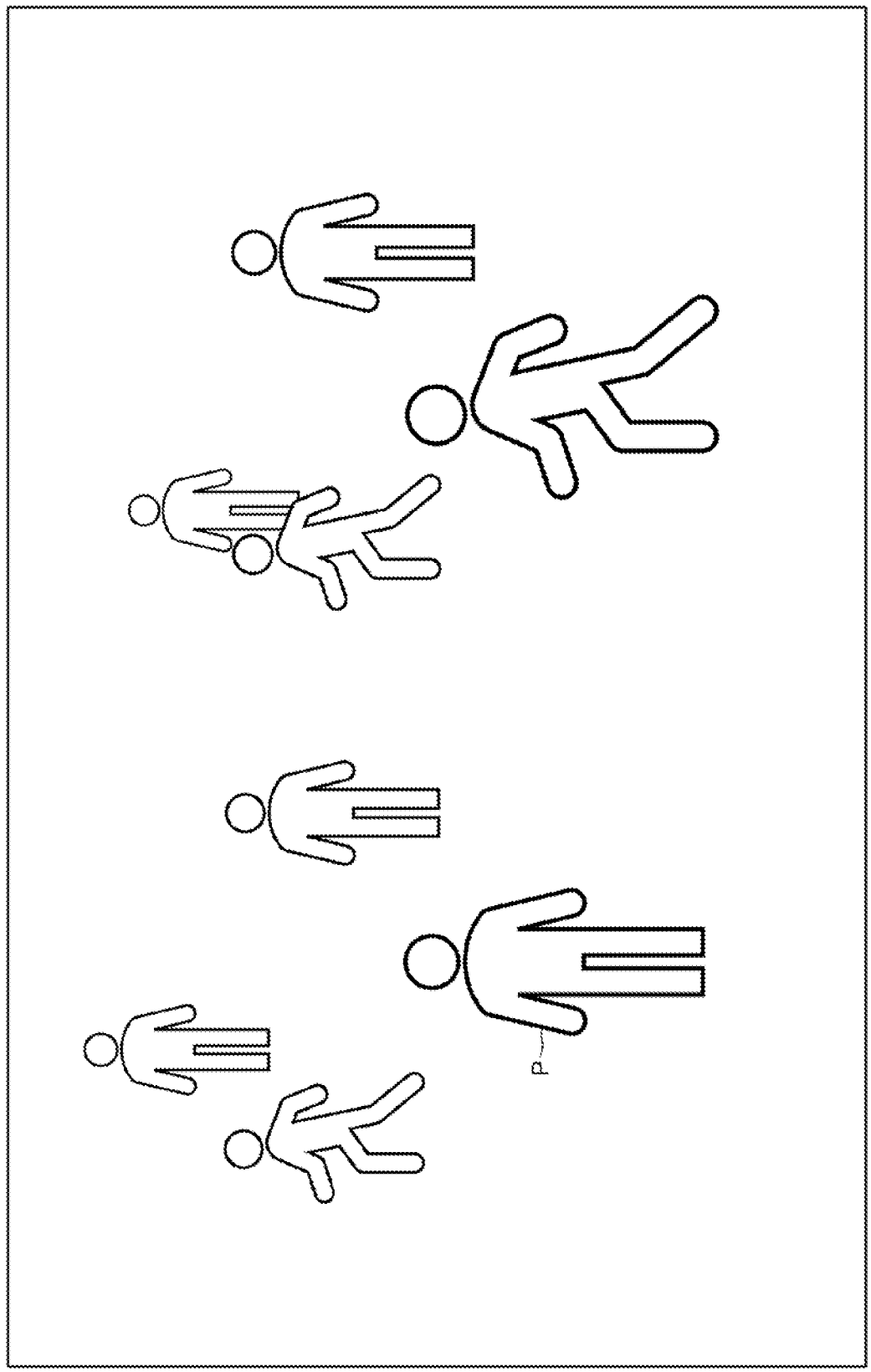
FIG. 4 is a view showing an example of an image output by the monitoring device disclosed in FIG. 1.

First, the person extraction part 11 (an extraction means) receives a captured image of the target place R captured by the camera C at a predetermined time interval. For example, as shown in FIG. 4, the person extraction part 11 receives a captured image of the target place R where a plurality of persons P exist, and temporarily stores the captured image. Although only one camera C is connected to the monitoring device 10 in this example embodiment, a plurality of cameras C may be connected, and an extraction process, a learning process, and a suspicious person detection process as will be described below may be performed on a captured image captured by each of the cameras C.

The person extraction part 11 extracts the person P in the captured image from the shape, color, movement, and so on of an object shown in the captured image (step S1 in FIG. 7). Further, based on an image portion of the person P extracted from the captured image, the person extraction part 11 extracts person attribute information representing an attribute of this person P (step S2 in FIG. 7). The person attribute information is, for example, information representing the gender, age (generation), and personal items such as clothes and belongings of the person P, and is extracted by image analysis from a face image, a body image, or the like of the person P.

Further, the person extraction part 11 also extracts action information representing an action of the person P in the captured image (step S3 in FIG. 7). For example, the person extraction part 11 extracts the direction of face, facial expression, line of sight and movement route of the person, whether the person is alone or in a group, and so on, as action information, from the face image or body image of the person, a distance between the person and another person, and so on. In this example embodiment, the person extraction part 11 acquires a captured image composed of a moving image from the camera C and extracts the attribute and action of a person as described above. However, the person extraction part 11 may acquire a captured image composed of a still image from the camera C and extract the attribute and action of a person. In this case, the person extraction part 11 may extract an attribute such as gender of a person and an action such as the direction of face of a person from a single still image, or may extract the attribute and action of a person from a plurality of still images which are consecutive along time series.

Furthermore, the person extraction part 11 acquires scene information of the target place R at the time of extracting the person attribute information and the action information for each person P as described above. To be specific, the person extraction part 11 acquires, as the scene information, place information representing the attribute of the target place R or a specific place, and environment information representing the surrounding environment of the target place R. For example, the person extraction part 11 acquires, as the place information, camera identification information and camera position information assigned to the camera C capturing an image of the target place R, and acquires place information associated with the camera identification information and the camera position information. For example, the place information may be information representing an attribute of a place such as "cosmetics section in department store", or may be information representing a specific place such as "XX Department Ginza Store". Moreover, the person extraction part 11 acquires date, season, weather, and so on, as the environment information from another information processing device connected via a network. The place information and environment information described above are not limited to the abovementioned information, and may be acquired by any method. Then, the person extraction part 11 associates the scene information including the place information and the environment information with the extracted person attribute information and action information, and stores into the person information storage part 14.

The learning part 12 (a reference attribute information generation means) retrieves the person attribute information and action information extracted from the captured image and stored in the person information storage part 14 as described above. Then, by learning the person attribute information and the action information, the learning part 12 generates reference attribute information representing an attribute and action of the person P corresponding to the target place R, that is, scene information (step S4 in FIG. 7). For example, the learning part 12 generates the reference attribute information by learning, from the genders and ages of the extracted persons P, the distribution of ages for each gender of the persons P who visit "cosmetics section" that is the target place R, as shown in FIG. 3. In the example of FIG. 3, it can be seen that the attributes of the persons P who visit "cosmetics section" that is the target place R are mostly twenty- to sixty-year-old women (see reference symbol W) and the number of men is extremely small (see reference symbol M). Thus, the reference attribute information represents the attributes of a plurality of persons. Then, the learning part 12 associates the generated reference attribute information with the scene information and stores into the reference information storage part 15 (a storage means) (step S5 in FIG. 7).

The learning part 12 may also learn the environment information or action information associated with the person attribute information and generate the reference attribute information. For example, the learning part 12 may generate, as the reference attribute information, the distribution of ages for each gender of only the persons P acting alone from the action information, or may generate, as the reference attribute information, the distribution of ages for each gender of the persons P acting in a group. Moreover, the learning part 12 may generate, as the reference attribute information, statistics of the directions of faces or movement routes for each gender of the persons P from the action information. As another example, the learning part 12 may generate, as the reference attribute information, specific operations of the persons P such as taking a product from the store shelf/returning a product to the store shelf, wandering, staying in a specific place for a certain period of time, looking at a specific product for a certain period of time, and looking around a place other than the store shelf, from the action information. Besides, the learning part 12 may generate the distribution of ages for each gender of the persons P for each season or each time of day, from the environment information.

The learning part 12 generates the reference attribute information using, for example, the person attribute information for each scene information stored when the target place R is determined to be in a normal state, by a prior setting or external input. That is, the reference attribute information for each scene information stored in the reference information storage part 15 is one that the place information and the environment information are those of the normal state. Moreover, the learning part 12 may keep learning using, for example, the person attribute information extracted from a newly captured image by the person extraction part 11 described above and update the reference attribute information in the reference information storage part 15. The reference attribute information stored in the reference information storage part 15 is not necessarily limited to that learned by the learning part 12 as described above, and information prepared beforehand may be stored.

FIG. 2B shows an example of the reference attribute information generated by the learning part 12 and stored in the reference information storage part 15. For example, for the place information "cosmetics section" and the environment information "holiday", person attributes "woman in her twenties or more" and "couple of man and woman in their thirties or more" and actions "look at product" and "pick up product" are stored as the reference attribute information. As another example, for the scene information "XX Department Ginza Store" and the environment information "summer", a person attribute "lightly dressed (clothes)" is stored as the reference attribute information. However, the reference attribute information shown in FIG. 2B is merely an example, and the distribution of ages for each gender of the persons P as shown in FIG. 3 for each season or each time of day may be stored as the reference attribute information as it is, or may be any other information.

Although the example of FIG. 2B illustrates a case where the attributes and actions of the persons P in the normal state are the reference attribute information for the place information and the environment information, the attributes and actions of the persons P in an abnormal state, namely, the persons P who apply to suspicious persons may be the reference attribute information. For example, for the place information "cosmetics section" and the environment information "weekday", a person attribute such as "group of men" and an action such as "look around something other than product" may be stored as the reference attribute information. Besides, as the reference attribute information, the attribute and action of a person expected to be a prospect desired to visit the store for the place information and the environment information may be stored.

As described above, the reference information storage part 15 in which the reference attribute information is stored is not necessarily limited to being provided in the monitoring device 10, and may be provided in another information processing device. In this case, the monitoring device 10 may connect to another information processing device via a network, and store the generated reference attribute information or retrieve the stored reference attribute information as will be described later.

The detection part 13 (a detection means) detects a suspicious person from among the persons P in a newly captured image. For this, firstly, on the newly captured image, the person extraction part 11 extracts the person P from the captured image as described above (step S11 in FIG. 8), extracts the person attribute information, action information and environment information of this person P (steps S12 and S13 in FIG. 8), and passes the extracted information to the detection part 13. At this time, the detection part 13 acquires the camera identification information and camera position information assigned to the camera C having captured the captured image, and extracts the place information associated with the above information. Then, the detection part 13 retrieves the reference attribute information stored in the reference information storage part 15 in association with the extracted place information and environment information, and compares the retrieved reference attribute information with the person attribute information and so on extracted from the newly captured image (step S14 in FIG. 8).

In a case where the extracted person attribute information and action information do not agree with the reference attribute information in accordance with a preset criterion, the detection part 13 detects the person P as a suspicious person (Yes at step S15 in FIG. 8). For example, it is assumed that the reference attribute information includes the distribution of ages for each gender of the persons P each acting alone as shown in FIG. 3 or includes "woman in her twenties or more" corresponding to the scene information "cosmetics section" and the environment information "weekday". At this time, in a case where newly extracted person attribute information is "man in his sixties" or "group (plurality) of men", the detection part 13 determines that it does not agree with the reference attribute information and detects the person P or the group of persons as a suspicious person/suspicious persons. Thus, the detection part 13 can detect a plurality of persons P (a group) as suspicious persons by comparing the person attribute information and so on of the plurality of persons P with the reference attribute information. Judgment that the extracted person attribute information and action information do not agree with the reference attribute information is performed, for example, in a case where a probability (for example, likelihood) that the extracted person attribute information and action information agree with the reference attribute information is a threshold or less (for example, 20% or less). However, such judgment may be performed by any method.

The detection part 13 displays and outputs the captured image including the information of the suspicious person on the output device 20 (step S16 in FIG. 8). FIG. 4 shows a state when the captured image itself is output to the output device 20, and a person P1 having been detected as the suspicious person is displayed on the captured image so as to be distinguished. For example, as shown in FIGS. 5 and 6, the suspicious person P1 may be filled with a predetermined color and displayed, or the suspicious person P1 may be displayed by any other method so as to be noticeable, for example, by putting a border around the suspicious person or putting a mark on the suspicious person. Besides, the detection part 13 may track the person P in the captured image as the person P moves and also track a suspicious person P1 and display as a suspicious person.

Another example of a case where a suspicious person is detected by the detection part 13 will be described. For example, the reference attribute information includes person attribute "woman in her twenties or more" corresponding to the scene information "cosmetics section" and the environmental information "weekday" and includes actions "look at product" and "pick up product" in FIG. 2B. In this case, even if the person attribute information extracted from the person P is "woman in her twenties", in a case where the action information is "looking around (not facing store shelf)", it does not agree with the reference attribute information, so that the person P is detected as a suspicious person.

Further, as still another example, in a case where the reference attribute information represents the size of a bag possessed by the person P and is information "small size", when the size of a bag possessed by the person P as the person attribute information extracted from the person P is "large size", it does not agree with the abovementioned reference attribute information, so that the person P is detected as a suspicious person. Moreover, as still another example, in a case where the reference attribute information represents the clothes of the person P and is information "lightly clothed", when the clothes as the person attribute information extracted from the person P is "heavily clothed", it does not agree with the abovementioned reference attribute information, so that the person P is detected as a suspicious person.

In the above description, a case of detecting the person P that the person attribute information extracted from the person does not agree with the reference attribute information has been exemplified. However, the person P with the person attribute information agreeing with the reference attribute information may be detected. In other words, it is possible to detect a suspicious person in a case where the reference attribute information itself is information that applies to a suspicious person, and it is possible to detect a desired prospect in a case where the reference attribute information itself is information that applies to a person who can be a prospect desired by the store to visit them.

Further, the detection part 13 may specify the person P to be tracked from the action information of the person P in the captured image and detect the suspicious person P1 from the action information of this specified person P. For example, in a case where the person P who conducts a preset action such as stops in the same place very often or wanders is tracked and this person P conducts the action stored as the reference attribute information, the detection part 13 may detect the person P as the suspicious person P1. Moreover, the detection part 13 may accumulate the number of times that the person P is detected as the suspicious person P1 and, only when the number of times becomes a threshold or more, finally determine this person P to be the suspicious person P1 and output.

Further, for example, in a case where the reference attribute information representing the distribution of ages for each gender of the persons P as shown in FIG. 3 is stored, the detection part 13 may detect "man of generation" dominating a few percent or less of the total, as a suspicious person. Moreover, as another example, in a case where, based on an image captured when an abnormal state such as a crime has been caused in the target place R, the attribute of the person P having caused the abnormal state is stored as the reference attribute information, the detection part 13 can detect the person P who may cause the abnormal state as a suspicious person. For example, in a case where a person's action "take article other than product" is stored as the reference attribute information for the scene information "cosmetics section", the detection part 13 detects the person P having performed this action as a suspicious person.

Thus, according to the present invention, by preparing reference attribute information representing a person's attribute corresponding to a target place and comparing the attribute of a person in a captured image of the target place with the reference attribute information, it is possible to detect a desired person in the target place. Consequently, for example, it is possible to use the present invention for security by detecting a suspicious person who seems inappropriate in a target place. Moreover, in another example, it is possible to use the present invention for service by detecting a prospect who seems appropriate in a target place.

In the above description, a case of using both a person's attribute and a person's action as the reference attribute information has been exemplified, but only at least one of the information may be used as the reference attribute information in the present invention. That is, according to the present invention, a suspicious person may be detected from only a person's attribute extracted from a new captured image based on a person's attribute stored as the reference attribute information, or a suspicious person may be detected from only a person's action extracted from a new captured image based on a person's action stored as the reference attribute information.

Second Example Embodiment

Figure 9:
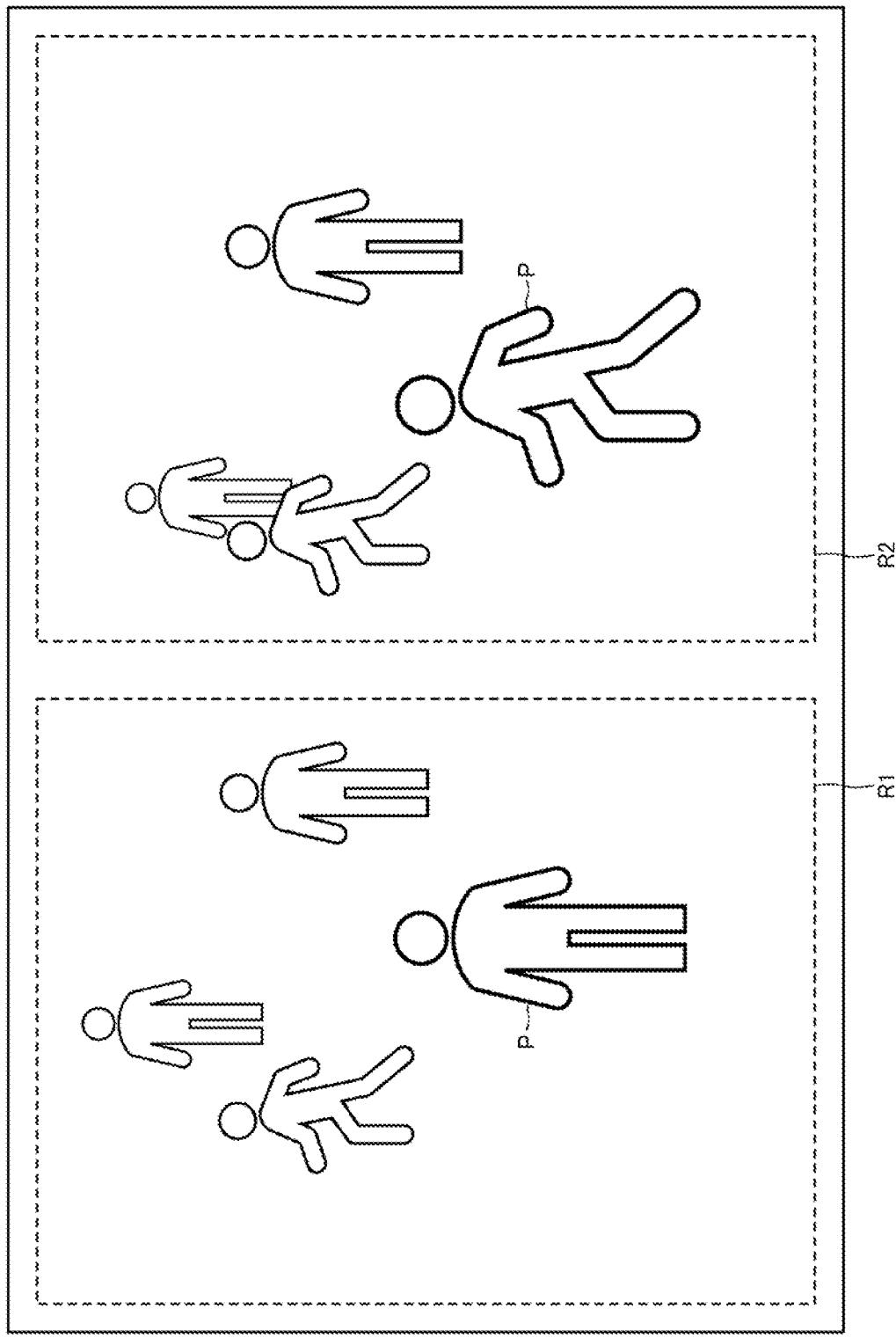
FIG. 9 is a view showing an example of an image output by a monitoring device in a second example embodiment of the present invention.

Next, a second example embodiment of the present invention will be described with reference to FIG. 9. FIG. 9 is a view showing an example of an image output by the monitoring device 10 in the second example embodiment.

An information processing system in this example embodiment has almost the same configuration as in the first example embodiment described above. Although the monitoring device 10 sets almost the whole captured image captured by the single camera C as the target place R to be monitored in the first example embodiment, the monitoring device 10 sets division regions obtained by dividing a captured image captured by the single camera C as the target places R to be monitored in this example embodiment.

FIG. 9 shows a captured image captured by the single camera C, and it is assumed that two difference places (e.g., two sections) are shown on the left and right sides in the horizontal direction of the captured image. In this case, the monitoring device 10 divides the captured image into left and right parts, and sets the left part as a first division region R1 and the right part as a second division region R2. Then, for each of the first division region R1 and the second division region R2, the monitoring device 10 extracts the person P to generate the reference attribute information by learning, and detects a suspicious person from the reference attribute information and the attribute and action of the newly extracted person P.

To be specific, the monitoring device 10 acquires the scene information including the place information and the environment information corresponding to the first division region R1, from the camera identification information of the camera C and region information designating the division region. Then, the monitoring device 10 extracts the attribute information and action information of the person P who is shown only in the first division region R1, learns the information, and generates and stores the reference attribute information corresponding to the place information and environment information of the first division region R1. After that, the monitoring device 10 extracts the person P in the first division region R1 and, in a case where the attribute information and action information of the extracted person P agrees/do not agree with the reference attribute information stored corresponding to the first division region R1, detects the extracted person P as a suspicious person.

Further, the monitoring device 10 also performs, on the second division region R2 in the same captured image, the same processing performed on the first division region R1 as described above. First, the monitoring device 10 acquires the scene information including the place information and the environment information corresponding to the second division region R2 from the camera identification information of the camera C and the region information designating the division region. Then, the monitoring device 10 extracts the attribute information and the action information of the person P shown only in the second division region R2, learns the information, and generates and stores the reference attribute information corresponding to the place information and the environment information of the second division region R1. After that, the monitoring device 10 extracts the person P in the second division region R2 and, in a case where the attribute information and the action information of the extracted person P agree/do not agree with the reference attribute information stored corresponding to the second division region R2, detects the extracted person P as a suspicious person.

With this, it is possible to set the reference attribute information for each of the division regions R1 and R2 in the captured image. For example, in a case where the attributes (gender, generation, and so on) and actions (e.g., just see a product, need to try a product, and so on) of visitors are different for each of the sections corresponding to the division regions R1 and R2, it is possible to set appropriate reference attribute information representing the attribute and action of a person in the normal state or the abnormal state for each section. As a result, it is possible to appropriately detect a suspicious person for each of the division regions R1 and R2.

Third Example Embodiment

Figure 10:
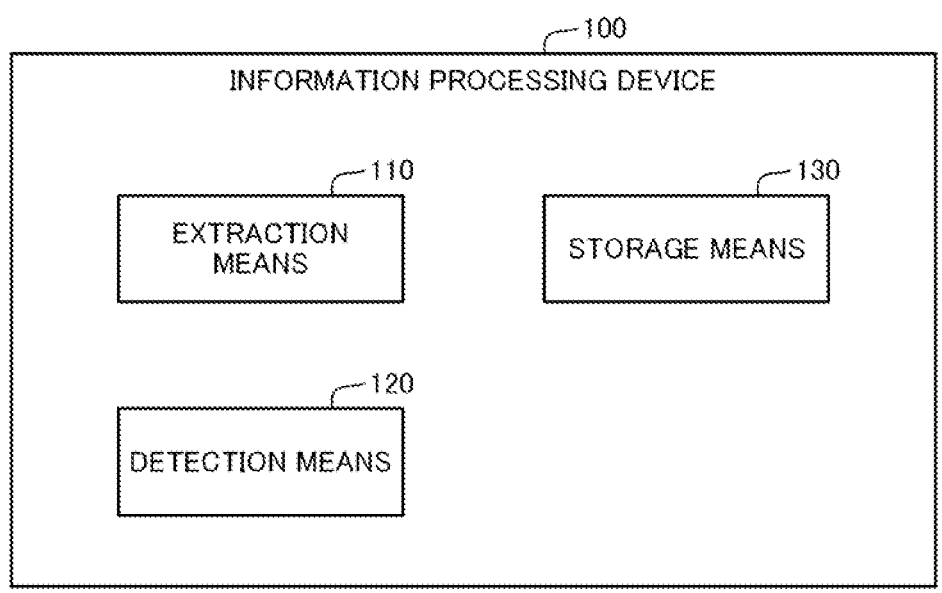
FIG. 10 is a block diagram showing the configuration of an information processing device in the second example embodiment of the present invention.

Next, a third example embodiment of the present invention will be described with reference to FIG. 10. FIG. 10 is a block diagram showing the configuration of an information processing device in the third example embodiment. This example embodiment shows the overview of the configuration of the monitoring device described in the first and second example embodiments.

As shown in FIG. 10, an information processing device 100 in this example embodiment includes: a storage means 130 storing reference attribute information representing a person's attribute corresponding to a target place; an extraction means 110 extracting person attribute information representing an attribute of a person in a captured image obtained by capturing an image of the target place; and a detection means 120 detecting a person in the captured image based on the reference attribute information and the person attribute information.

The extraction means 110 and the detection means 120 described above may be constructed by an arithmetic logic unit of the information processing device 100 executing a program, or may be constructed by an electronic circuit.

Then, the information processing device 100 with the above configuration operates so as to execute processes of: extracting person attribute information representing an attribute of a person in a captured image obtained by capturing an image of a target place; and detecting a person in the captured image based on reference attribute information representing a person's attribute corresponding to the target place stored in a storage means and based on the person attribute information.

According to the present invention, it is possible to detect a desired person in a target place by comparing prepared reference attribute information representing a person's attribute corresponding to the target place with an attribute of a person in a captured image obtained by capturing an image of the target place.

SUPPLEMENTARY NOTES

The whole or part of the example embodiments disclosed above can be described as in the following supplementary notes. Below, the overview of the configurations of the information processing system, the information processing method and the program according to the present invention will be described. However, the present invention is not limited to the following configurations.

Supplementary Note 1

An information processing device comprising:
a storage means that stores reference attribute information representing an attribute of a person corresponding to a target place;
an extraction means that extracts person attribute information representing an attribute of a person in a captured image obtained by capturing an image of the target place; and
a detection means that detects a predetermined person in the captured image based on the reference attribute information and the person attribute information.

Supplementary Note 2

The information processing device according to Supplementary Note 1, wherein the detection means detects the predetermined person in the captured image based on the reference attribute information representing attributes of a plurality of persons and the person attribute information representing an attribute of one person or attributes of a plurality of persons.

Supplementary Note 3

The information processing device according to Supplementary Note 1 or 2, wherein in a case where the person attribute information agrees with the reference attribute information in accordance with a predetermined criterion or does not agree with the reference attribute information in accordance with the predetermined criterion, the detection means detects the predetermined person in the captured image corresponding to the person attribute information.

Supplementary Note 4

The information processing device according to any of Supplementary Notes 1 to 3, wherein:

the reference attribute information is set for each surrounding environment; and the detection means detects the predetermined person in the captured image based on the reference attribute information set corresponding to the surrounding environment of the captured image and the person attribute information.

Supplementary Note 5

The information processing device according to any of Supplementary Notes 1 to 4, wherein:

the extraction means extracts action information representing an action of a person in the captured image; and the detection means detects the predetermined person in the captured image corresponding to the person attribute information, based on the reference attribute information, the person attribute information, and the action information.

Supplementary Note 6

The information processing device according to any of Supplementary Notes 1 to 5, further comprising a reference attribute information generation means that extracts the attribute of the person in the captured image obtained by capturing the image of the target place, and generates the reference attribute information corresponding to the target place based on the extracted attribute of the person and stores the reference attribute information.

Supplementary Note 7

The information processing device according to any of Supplementary Notes 1 to 6, wherein the attribute is information representing an age of a person, information representing a gender of a person, or information representing personal belongings of a person.

Supplementary Note 8

A computer program comprising instructions for causing an information processing device to realize:

an extraction means that extracts person attribute information representing an attribute of a person in a captured image obtained by capturing an image of a target place; and a detection means that detects a predetermined person in the captured image, based on reference attribute information representing an attribute of a person corresponding to the target place stored in a storage means, and based on the person attribute information.

Supplementary Note 8.1

The computer program according to Supplementary Note 8, wherein:

the reference attribute information is set for each surrounding environment; and the detection means detects the predetermined person in the captured image based on the reference attribute information set corresponding to the surrounding environment of the captured image and the person attribute information.

Supplementary Note 8.2

The computer program according to Supplementary Note 8 or 8.1, wherein:

the extraction means extracts action information representing an action of a person in the captured image; and the detection means detects the predetermined person in the captured image corresponding to the person attribute information, based on the reference attribute information, the person attribute information, and the action information.

Supplementary Note 8.3

The computer program according to any of Supplementary Notes 8 to 8.2, comprising instructions for causing the information processing device to further realize:

a reference attribute information generation means that extracts the attribute of the person in the captured image obtained by capturing the image of the target place, and generates the reference attribute information corresponding to the target place based on the extracted attribute of the person and stores the reference attribute information.

Supplementary Note 9

An information processing method comprising:

extracting person attribute information representing an attribute of a person in a captured image obtained by capturing an image of a target place; and detecting a predetermined person in the captured image, based on reference attribute information representing an attribute of a person corresponding to the target place stored in a storage means, and based on the person attribute information.

Supplementary Note 10

The information processing method according to Supplementary Note 9, wherein:

the reference attribute information is set for each surrounding environment; and the predetermined person in the captured image is detected based on the reference attribute information set corresponding to the surrounding environment of the captured image and the person attribute information.

Supplementary Note 11

The information processing method according to Supplementary Note 9 or 10, further comprising:

extracting action information representing an action of a person in the captured image; and detecting the predetermined person in the captured image corresponding to the person attribute information, based on the reference attribute information, the person attribute information, and the action information.

Supplementary Note 12

The information processing method according to any of Supplementary Notes 9 to 11, further comprising extracting the attribute of the person in the captured image obtained by capturing the image of the target place, and generating the reference attribute information corresponding to the target place based on the extracted attribute of the person and stores the reference attribute information.

The above program is stored using various types of non-transitory computer-readable mediums, and can be supplied to the computer. The non-transitory computer-readable medium includes various types of tangible recording mediums. Examples of the non-transitory computer-readable medium include a magnetic recording medium (a flexible disk, a magnetic tape, a hard disk drive, etc.), a magneto-optical recording medium (a magneto-optical disk, etc.), a CD-ROM (Read Only Memory), a CD-R, a CD-R/W, and a semiconductor memory (a mask ROM, a PROM (Programmable ROM), an EPROM (Erasable PROM), a flash ROM, a RAM (Random Access Memory), etc.). The program may be supplied to the computer by various types of transitory computer-readable mediums. Examples of the transitory computer-readable medium include an electric signal, an optical signal, and an electromagnetic wave. The transitory computer-readable medium can supply the program to the computer via a wired communication path such as an electric wire and an optical fiber, or via a wireless communication path.

Although the present invention has been described with reference to the above example embodiment and so on, the present invention is not limited to the above example embodiments. The configurations and details of the present invention can be changed in various manners that can be understood by one skilled in the art within the scope of the present invention.

DESCRIPTION OF REFERENCE NUMERALS 10 monitoring device
11 person extraction part
12 learning part
13 detection part
14 person information storage part
15 reference information storage part
20 output device
100 information processing device
110 extraction means
120 detection means
130 storage means
C camera
P person
P1 suspicious person
R target place

What is claimed is:

1. An information processing device comprising:
a memory in which instructions are stored; and
at least one processor configured to execute the instructions to:
acquire environment information representing a surrounding environment of a target place from another information processing device connected via a network;
acquire, based on the environment information, reference attribute information representing an attribute of a person corresponding to the target place and reference action information associated with the target place, from a storage device in which the reference attribute information and the reference action information are stored;
extract person attribute information representing an attribute of a person and person action information of the person in a captured image obtained by capturing an image of the target place; and
detect, in the caputred image, a predetermined person performing a predetermined action in the target place, based on the reference attribute information, the reference action information, the person attribute information, and the person action information.

2. The information processing device according to claim 1, wherein the at least one processor is configured to execute the instructions to detect the predetermined person in the captured image based on the reference attribute information representing attributes of a plurality of persons and the person attribute information representing an attribute of one person or attributes of a plurality of persons.

3. The information processing device according to claim 1, wherein the at least one processor is configured to execute the instructions to detect, in a case where the person attribute information agrees with the reference attribute information in accordance with a predetermined criterion or does not agree with the reference attribute information in accordance with the predetermined criterion, the predetermined person in the captured image corresponding to the person attribute information.

4. The information processing device according to claim 1, wherein:
the reference attribute information is set to correspond to each of the target place and the surrounding environment of the target place; and
the at least one processor is configured to execute the instructions to detect the predetermined person in the captured image based on the reference attribute information set corresponding to each of the target place at which the captured image is captured and the surrounding environment and the person attribute information.

5. The information processing device according to claim 1, wherein:
the person action information represents an action of the person in the captured image.

6. The information processing device according to claim 1, wherein the at least one processor is configured to execute the instructions to:
extract the attribute of the person that is information representing an age of the person, information representing a gender of the person, or information representing personal belongings of the person in the captured image obtained by capturing the image of the target place; and
generate and store the reference attribute information corresponding to the target place based on the extracted attribute of the person.

7. A non-transitory computer-readable medium storing a program comprising instructions for causing an information processing device to execute processes of:
acquiring environment information representing a surrounding environment of a target place from another information processing device connected via a network;
acquiring, based on the environment information, reference attribute information representing an attribute of a person corresponding to the target place and reference action information associated with the target place, from a storage device in which the reference attribute information and the reference action information are stored;
extracting person attribute information representing an attribute of a person and person action information of the person in a captured image obtained by capturing an image of the target place; and
detecting, in the captured image, a predetermined person performing a predetermined action in the target place, based on the reference attribute information, the reference action information, the person attribute information, and the person action information.

8. An information processing method performed by a an information processing device and comprising:
acquiring environment information representing a surrounding environment of a target place from another information processing device connected via a network;

acquiring, based on the environment information, reference attribute information representing an attribute of a person corresponding to the target place and reference action information associated with the target place, from a storage device in which the reference attribute information and the reference action information are stored;

extracting person attribute information representing an attribute of a person and person action information of the person in a captured image obtained by capturing an image of the target place; and detecting, in the captured image, a predetermined person performing a predetermined action in the target place, based on the reference attribute information, the reference action information, the person attribute information, and the person action information.

9. The information processing method according to claim 8, wherein:

the reference attribute information is set to correspond to each of the target place and the surrounding environment of the target place; and the predetermined person in the captured image is detected based on the reference attribute information set corresponding to each of the target place at which the captured image is captured and the surrounding environment and the person attribute information.

10. The information processing method according to claim 8, wherein the person action information represents an action of the person in the captured image.

11. The information processing method according to claim 8, further comprising:

extracting the attribute of the person that is information representing an age of the person, information representing a gender of the person, or information representing personal belongings of the person in the captured image obtained by capturing the image of the target place; and the reference attribute information corresponding to the target place based on the extracted attribute of the person.

12. The information processing device according to claim 1, wherein the environment information includes at least one of date, season, and weather.

* * * * *